United States Patent
Tan et al.

(10) Patent No.: US 10,321,377 B1
(45) Date of Patent: *Jun. 11, 2019

(54) PROFILE SWITCHING POWERED BY LOCATION

(71) Applicant: Google LLC, Mountain View, CA (US)

(72) Inventors: Weihua Tan, Fremont, CA (US); Shishir Kumar Agrawal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,481

(22) Filed: Apr. 19, 2017

Related U.S. Application Data

(63) Continuation of application No. 14/689,857, filed on Apr. 17, 2015, now Pat. No. 9,648,537.

(51) Int. Cl.
*H04W 36/30* (2009.01)
*H04W 48/18* (2009.01)
(Continued)

(52) U.S. Cl.
CPC .......... *H04W 36/30* (2013.01); *H04B 17/318* (2015.01); *H04W 4/029* (2018.02);
(Continued)

(58) Field of Classification Search
CPC ......... H04W 72/0486; H04W 28/0236; H04W 28/0268; H04W 28/12; H04W 72/04;
(Continued)

(56) References Cited

U.S. PATENT DOCUMENTS

| 6,128,490 A | 10/2000 | Shaheen et al. |
| 6,381,315 B1 | 4/2002 | Nhaissi |
| (Continued) | | |

FOREIGN PATENT DOCUMENTS

| EP | 1885144 | 2/2008 |
| EP | 2244501 | 10/2010 |
| (Continued) | | |

OTHER PUBLICATIONS

Ericsson: "RAN-ANDSF Interwar", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.

(Continued)

*Primary Examiner* — Phuoc H Doan
(74) *Attorney, Agent, or Firm* — Faegre Baker Daniels LLP

(57) ABSTRACT

A device and method for profile switching based on location and wireless network quality are provided. A client device determines relevant locations for a user of the client device based on a variety of factors. After determining that a location is of particular relevance to the user, the client device will proceed to collect wireless network parameters for each available wireless network at each of the relevant locations for the user. The client device then determines a quality score for each wireless network at each relevant location and proceeds to utilize the quality score to make wireless network profile switching decisions as the client device travels between the relevant locations.

21 Claims, 6 Drawing Sheets

(51) Int. Cl.
*H04W 36/32* (2009.01)
*H04B 17/318* (2015.01)
*H04W 4/029* (2018.01)
*H04W 8/18* (2009.01)
*H04W 8/26* (2009.01)

(52) U.S. Cl.
CPC ............ *H04W 36/32* (2013.01); *H04W 48/18* (2013.01); *H04W 8/183* (2013.01); *H04W 8/26* (2013.01)

(58) Field of Classification Search
CPC . H04W 36/22; H04W 4/003; H04W 28/0289; H04W 92/02; H04L 47/125; H04L 45/64; H04L 47/18; H04L 27/0006; H04B 7/0613
USPC ..... 455/453, 436, 509, 452.1, 454; 370/329, 370/341, 230
See application file for complete search history.

(56) References Cited

U.S. PATENT DOCUMENTS

| | | | |
|---|---|---|---|
| 6,633,761 | B1 | 10/2003 | Singhal et al. |
| 7,180,898 | B2 | 2/2007 | Yoshida et al. |
| 7,433,929 | B2 | 10/2008 | Guilford et al. |
| 7,509,131 | B2 | 3/2009 | Krumm et al. |
| 7,809,360 | B2 | 10/2010 | Agrawal et al. |
| 7,848,292 | B2 | 12/2010 | Bi et al. |
| 8,131,317 | B2 | 3/2012 | Lee |
| 8,155,081 | B1 | 4/2012 | Mater et al. |
| 8,165,581 | B2 | 4/2012 | Joshi et al. |
| 8,200,217 | B2 | 6/2012 | Kanade et al. |
| 8,238,980 | B1 | 8/2012 | Shusterman |
| 8,391,192 | B2 | 3/2013 | Prakash et al. |
| 8,477,645 | B2 | 7/2013 | Scherzer et al. |
| 8,484,568 | B2 | 7/2013 | Rados et al. |
| 8,542,637 | B2 | 9/2013 | Bandhakavi et al. |
| 8,565,766 | B2 | 10/2013 | Scherzer et al. |
| 8,590,023 | B2 | 11/2013 | Gupta et al. |
| 9,648,537 | B2 | 5/2017 | Tan et al. |
| 2002/0169716 | A1 | 11/2002 | Johnson et al. |
| 2004/0246920 | A1 | 12/2004 | Savolainen |
| 2005/0245269 | A1 | 11/2005 | Demirhan et al. |
| 2006/0098625 | A1 | 5/2006 | King et al. |
| 2006/0193295 | A1 | 8/2006 | White et al. |
| 2007/0037550 | A1 | 2/2007 | Armstrong et al. |
| 2007/0064684 | A1 | 3/2007 | Kottilingal |
| 2007/0127391 | A1 | 6/2007 | Goodman |
| 2007/0147317 | A1 | 6/2007 | Smith et al. |
| 2008/0002668 | A1 | 1/2008 | Asokan et al. |
| 2008/0009279 | A1 | 1/2008 | Sakawa |
| 2008/0107051 | A1 | 5/2008 | Chen et al. |
| 2008/0233977 | A1 | 9/2008 | Xu et al. |
| 2009/0061862 | A1 | 3/2009 | Alberth, Jr. et al. |
| 2009/0168757 | A1 | 7/2009 | Bush |
| 2009/0298467 | A1 | 12/2009 | Zohar |
| 2010/0172323 | A1 | 7/2010 | Rexhepi et al. |
| 2010/0304737 | A1 | 12/2010 | Jain et al. |
| 2011/0096673 | A1 | 4/2011 | Stevenson et al. |
| 2011/0216694 | A1 | 9/2011 | Plasberg et al. |
| 2011/0306318 | A1 | 12/2011 | Rodgers et al. |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0108206 | A1 | 5/2012 | Haggerty |
| 2012/0178488 | A1 | 7/2012 | Jonker et al. |
| 2012/0195223 | A1 | 8/2012 | Raleigh |
| 2012/0282915 | A1 | 11/2012 | Haynes et al. |
| 2013/0040693 | A1 | 2/2013 | Chen et al. |
| 2013/0121194 | A1 | 5/2013 | Heshmati |
| 2013/0148567 | A1 | 6/2013 | Efrati et al. |
| 2013/0155842 | A1 | 6/2013 | Moore et al. |
| 2013/0165117 | A1 | 6/2013 | Narayanan |
| 2013/0203438 | A1 | 8/2013 | Shin |
| 2013/0225169 | A1 | 8/2013 | Farnsworth et al. |
| 2013/0227647 | A1 | 8/2013 | Thomas et al. |
| 2013/0230023 | A1 | 9/2013 | Gray et al. |
| 2013/0303156 | A1 | 11/2013 | Astrom et al. |
| 2014/0071895 | A1 | 3/2014 | Bane et al. |
| 2014/0080539 | A1 | 3/2014 | Scherzer et al. |
| 2014/0127992 | A1 | 5/2014 | Kuscher et al. |
| 2014/0148100 | A1 | 5/2014 | Kim et al. |
| 2014/0148170 | A1 | 5/2014 | Damji et al. |
| 2014/0211648 | A1 | 7/2014 | Rahmati et al. |
| 2014/0213256 | A1 | 7/2014 | Meylan et al. |
| 2015/0098393 | A1* | 4/2015 | Tofighbakhsh ....... H04W 24/02 370/329 |
| 2015/0127939 | A1 | 5/2015 | Mazandarany et al. |
| 2015/0141037 | A1 | 5/2015 | Saha et al. |
| 2015/0281198 | A1 | 10/2015 | Lee et al. |
| 2016/0037340 | A1 | 2/2016 | Rayment et al. |
| 2016/0261596 | A1 | 9/2016 | Khello et al. |
| 2016/0316410 | A1 | 10/2016 | Tan et al. |

FOREIGN PATENT DOCUMENTS

| | | |
|---|---|---|
| WO | 2002-041580 | 5/2002 |
| WO | 2004-047476 | 6/2004 |
| WO | 2006-005947 | 1/2006 |
| WO | 2008-060464 A2 | 5/2008 |
| WO | 2011-162688 | 12/2011 |
| WO | 2013/020598 A1 | 2/2013 |
| WO | 2013/044359 A1 | 4/2013 |
| WO | 2014-011094 | 1/2014 |
| WO | 2015-158263 | 10/2015 |

OTHER PUBLICATIONS

Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.

Bircher et al., "An Agent-Based Architecture for Service Discovery and Negotiation in Wireless Networks," University of Bern, Wired/Wireless Internet Comms. (WWIC), Jan. 21, 2004.

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

VoLGA Forum, "VoLGA Stage 2 V1.7.0: Voice over LTE via Generic Access," Jun. 14, 2010.

QUALCOMM Europe et al., "Text Proposal for UE Measurements for Minimizing Drive Tests," 3GPP TSG-RAN WG2 Meeting #66, R2-093175, May 4-8, 2009.

QUALCOMM Europe, "Framework for UE SON Reports," 3GPP TSG RAN WG3 & SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Niikravesh et al., "Mobile Network Performance from User Devices: A Longitudinal, Multidimensional Analysis," Passive and Active Measurement: 15th International Conference, PAM 2014, Mar. 10-11, 2014.

Korean Intellectual Property Office, International Search Report and the Written Opinion in International Application No. PCT/US2014/057709 dated Dec. 29, 2014.

Ge et al., "A History-Based Handover Prediction for LTE Systems" Computer Network and Multimedia Technology. CNMT. International Symposium on , vol., No., pp. 1,4, Jan. 18-20, 2009.

Gemalto N.V. "Card ADMIN," Document Reference D1225357A (Jun. 2, 2011).

Dicoda.com. "Multi IMSI," Dicoda.com (Jun. 20, 2013) (available at: https://web.archive.org/web/20130620191315/http://www.dicoda.com/introduction/imsi).

Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).

(56) References Cited

OTHER PUBLICATIONS

Tobias, Marc Weber. "The Split Personality Cell Phone That Saves You Money on Overseas Calling," Forbes.com (Aug. 20, 2013) (available at: http://onforb.es/14gMCe4).

"Circuit-switched fallback. The first phase of voice evolution for mobile LTE devices." Qualcomm Incorporated, 2012 11 pages.

CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).

"Feature Requests—Republic Wireless Wiki," http://republic-wireless.wikia.com/wiki/Feature-Requests 1 pages.

"Republic Wireless," http://republicwireless.com 2 pages.

"T-Mobile's 4G Network—Check Your Coverage—T-Mobile Blazing Fast 4G Coverage" 9 pages.

"What is VoLTE | Voice Over LTE | Tutorial," Radio-Electronics.com, http://www.radio-electronics.com/info/cellulartelecomms/lte-long-term-evolution/voice-over/lte-volte.php 5 pages.

Levy, Martyn, "Best-Practice Authentication Methods for Wi-Fi Offload," http://www.acurixnetworks.com/single-post/2013/05/20/BestPractice-Authentication-Methods-For-WiFi-Offload, May 20, 2013.

European Patent Office; International Search Report and Written Opinion; International Application No. PCT/US2016/027757; dated Jul. 7, 2016.

U.S. Patent and Trademark Office; Non-Final Office Action; U.S. Appl. No. 14/689,857; dated Jun. 20, 2016.

\* cited by examiner

PROFILE SWITCHING POWERED BY LOCATION

CROSS REFERENCE TO RELATED APPLICATIONS

This application is a continuation of U.S. patent application Ser. No. 14/689,857, filed Apr. 17, 2015, entitled "PROFILE SWITCHING POWERED BY LOCATION", commonly assigned to the assignee of the present application, which is hereby incorporated by reference.

FIELD OF THE DISCLOSURE

This disclosure generally relates to client device and more particularly relates to wireless network profile switching for portable client devices based on a location.

BACKGROUND OF THE DISCLOSURE

Typically, at most locations, a plurality of wireless networks are available for a client device to achieve network connectivity. Typically, an available wireless network is selected by a client device or a user of the client device. However, the client device and the user do not have access to certain network performance parameters that will inform a decision to select a wireless network of the plurality of wireless networks to use for achieving the best network performance. Accordingly, the wireless network selection process is inefficient.

BRIEF SUMMARY OF THE DISCLOSURE

One embodiment provides a client device configured to choose a wireless network, the client device comprising: a location determination module configured to determine a location of the client device and to determine whether the location is a relevant location for the client device; and a wireless network selection module configured to: collect wireless network parameters from each of a plurality of wireless networks available at the relevant location; determine a highest quality wireless network based on the wireless network parameters; and connect the wireless network interface with the highest quality wireless network.

Another embodiment includes a method for configuring a client device to select a wireless network, the method comprising: capturing a current location of the client device; determining whether the current location of the client device is within an area defining a relevant location of one or more relevant locations for the client device; collecting wireless network parameters from available wireless networks at the current location of the client device when the current location is within the area defining the relevant location; determining a highest quality wireless network out of the available wireless networks; and connecting the client device to the highest quality wireless network.

Yet another embodiment includes a non-transitory computer readable storage device for configuring a client device to select a wireless network, the non-transitory computer readable storage device having computer executable instructions for performing the steps of: capturing a current location of the client device; determining whether the current location of the client device is within an area defining a relevant location of one or more relevant locations for the client device; collecting wireless network parameters from available wireless networks at the current location of the client device when the current location is within the area defining the relevant location; determining a highest quality wireless network out of the available wireless networks; and connecting the client device to the highest quality wireless network.

BRIEF DESCRIPTION OF THE DRAWINGS

The accompanying drawings incorporated in and forming a part of the specification illustrate several aspects of the present disclosure and, together with the description, serve to explain the principles of the disclosure. In the drawings.

DETAILED DESCRIPTION OF THE DISCLOSURE

Typically, at most locations, a plurality of wireless networks are available for a client device to achieve network connectivity. Typically, an available wireless network is selected by a client device or a user of the client device. However, the client device and the user do not have access to certain network performance parameters that will inform a decision to select a wireless network of the plurality of wireless networks to use for achieving the best network performance. Accordingly, the wireless network selection process is inefficient.

To increase the efficiency of network selection, a client device may collect wireless network parameters from each available wireless network at locations deemed important or relevant to the daily usage of the client device. The wireless network parameters characterize the performance of the associated wireless network. After the wireless network parameters have been collected from each wireless network available at the relevant locations, the client device may then select a wireless network to communicate with based on the collected wireless network parameters. Accordingly, the selection of the wireless network is an informed selection based on collected data.

Figure 1:
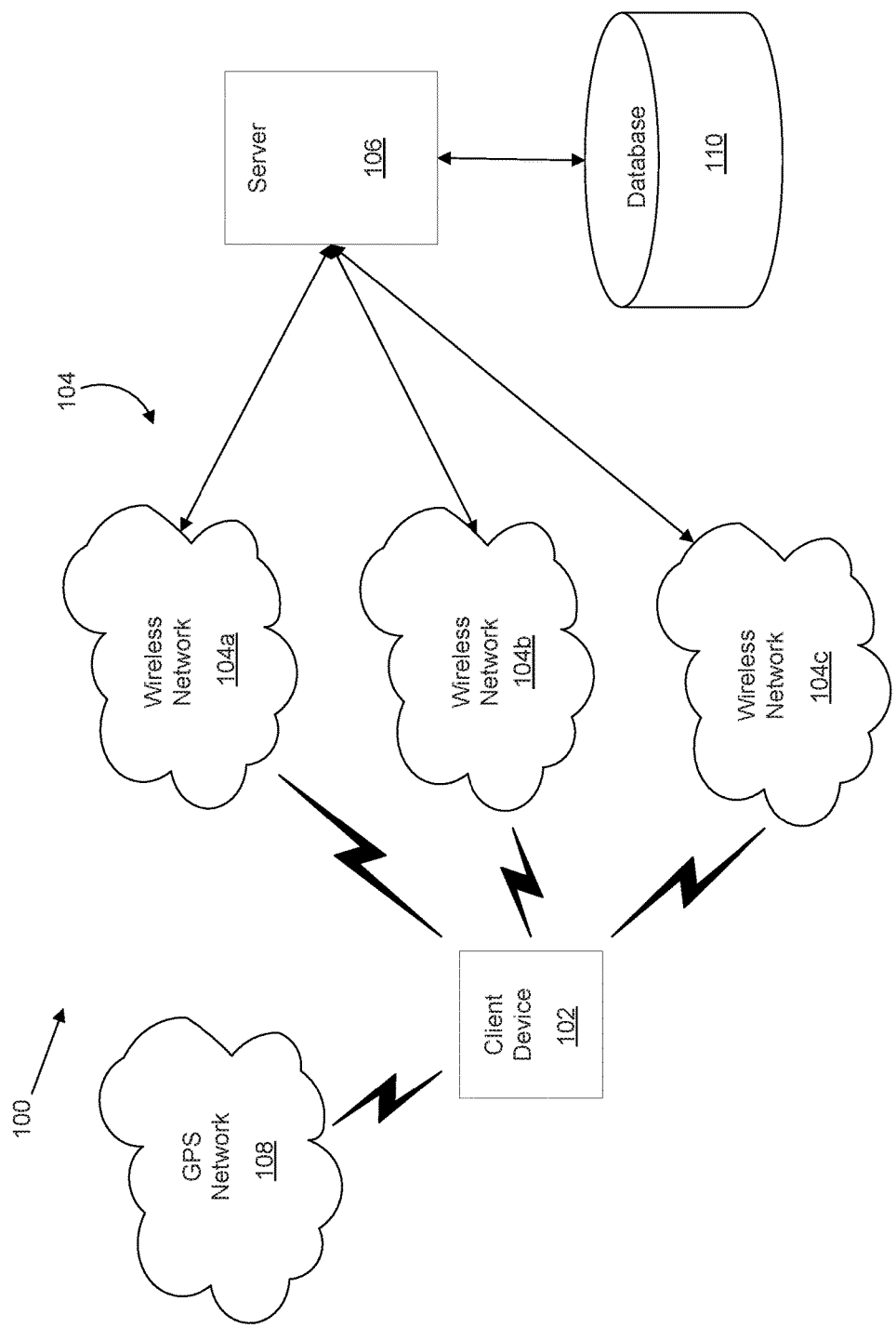
FIG. 1 is a block diagram illustrating a communications system, according to an example embodiment.

FIG. 1 illustrates a block diagram of an example communications system 100 in which various embodiments of the present disclosure may be implemented. In the communications system 100, a client device 102 communicates with a plurality of wireless networks 104, which in turn communicate with server 106. Further, in certain embodiments, the client device 102 may communicate with a Global Positioning System (GPS) network 108.

The client device 102 may be a mobile device such as a smart phone, a tablet computer, a laptop computer, a watch with a computer operating system, a personal digital assistant (PDA), a video game console, a wearable or embedded digital device(s), or any one of a number of additional devices capable of communicating over the plurality of wireless networks 104.

The plurality of wireless networks 104 may include but are not limited to Wide Area Networks (WAN) such as a Long Term Evolution (LTE) network, a Global System for Mobile Communications (GSM) network, a Code Division Multiple Access (CDMA) network, a Wideband Code Division Multiple Access (WCDMA) network or an Enhanced Data rates for GSM Evolution (EDGE) network, and Wireless Local Area Networks (WLAN) such as the various IEEE 802.11 standards, or any other kind of wireless network.

Further, the plurality of wireless networks 104 allow the client device 102 to communicate with the server 106. For example, client device 102 may transmit information to the server 106 and receive information from the server 106 through one or more wireless networks of the plurality of wireless networks 104. Further, the plurality of wireless networks 104 may each include a set of cell towers, as well as a set of base stations and/or mobile switching centers (MSCs). In some embodiments, the plurality of wireless networks 104 may include various cell tower/base station/MSC arrangements.

Further, server 106 is illustrated as a single server. However, server 106 could be implemented as a plurality of servers servicing specified geographic locations, or server 106 could be implemented as a cloud server. The singular server 106 is illustrated for ease of description. This singular server illustration is not intended to limit the disclosure contained herein.

During ordinary usage, a user will carry the client device 102 to and from various locations. Typically, out of all of the various locations the client device 102 will travel to, only a limited subset of those locations will be important or, in other words, relevant locations where the user spends a majority of their time. For instance, typical users spend most of their time in only a few locations such as at home, work, a gym, a grocery store, etc. Further, while at one of these relevant locations, the client device 102 will have several available options for achieving wireless connectivity to a wireless network, such as the plurality of wireless networks 104.

For instance, FIG. 1 illustrates an exemplary embodiment where three wireless networks 104a, 104b and 104c make up the plurality of wireless networks 104 at a particular relevant location, such as at the user's place of work. In this regard, there could be more or less wireless networks available besides the three wireless networks 104a, 104b and 104c.

Furthermore, without prior knowledge of the quality of each of wireless networks 104a, 104b and 104c, the client device 102 will generally make a decision on which network to connect to based purely on current signal strength as opposed to historically relevant data pertaining to the overall quality of that network. Accordingly, in order to improve the selection of a wireless network for connectivity at the relevant location, wireless network parameters will be collected for each of the available wireless networks 104a, 104b and 104c.

In one embodiment, the client device 102 operates in a wireless network parameter collection period during which the client device 102 collects wireless network parameters for a selected wireless network of the wireless networks 104a, 104b and 104c at the relevant location. For instance, in certain embodiments, the client device 102 may decide to attach to a single wireless network, such as wireless network 104a during a visit to the relevant location, and while attached to the wireless network 104a, the client device 102 will collect wireless network parameters useful to characterize the quality of wireless network 104a. Similarly, on subsequent visits to the relevant location, the client device 102 will attach to a different wireless network, such as wireless networks 104b and/or 104c and proceed to collect wireless network parameters for wireless networks 104b and 104c. In other embodiments, the client device 102 may attach to each of the wireless networks 104a, 104b and 104c during a single visit to the relevant location and collect wireless network parameters for each of the wireless networks 104a, 104b and 104c.

Generally, the plurality of wireless networks 104, including wireless networks 104a, 104b and 104c will comprise both voice and data networks. For instance, the plurality of wireless networks 104 may include both carrier cellular networks and WiFi networks. In certain embodiments, wireless network parameters for cellular networks may include a Mobile Country Code (MCC), a Mobile Network Code (MNC), an amount of time connected to the network, time of day while connected, a Radio Access Technology (RAT) and a measured Received Signal Strength Indicator (RSSI). Additionally, in certain embodiments, wireless network parameters for WiFi networks may include a Service Set Identifier (SSID), a Basic Service Set Identifier (BSSID), an amount of time connected to the network, time of day while connected, packet throughput, and latency. This list of wireless network parameters for both cellular and WiFi networks is not exhaustive. Therefore, the list may include more or fewer parameters for the client device 102 to collect.

In certain embodiments, the client device 102 will collect wireless network parameters and store them locally in memory in table form. For instance, for a cellular network, the table may comprise certain headers representing network names identified by the collected MNC/MCC data and any collected wireless network parameters associated with that wireless network. For a WiFi network, the table may comprise certain headers representing network names identified by the collected SSID/BSSID data and any collected wireless network parameters associated with that wireless network. Regardless of whether the wireless network is a carrier cellular network or a WiFi network, once the collected wireless network parameters have been captured, the client device 102 may then determine a quality score for each wireless network of the wireless networks 104a, 104b and 104c and store those scores locally at the client device 102. Whichever wireless network of the wireless networks 104a, 104b and 104c has the highest quality score is then selected as the preferred wireless network while the client device is in the associated relevant location. This process is performed for each relevant location for the client device 102.

Additionally, in certain embodiments, the quality score determination for the available wireless networks 104a, 104b and 104c will be recalculated after a threshold amount of time has expired. For instance, after two weeks time, the client device 102 may enter another wireless network parameter collection period, after which new quality scores will be determined for wireless networks 104a, 104b and 104c. Based on these new quality scores, the client device 102 will make connection decisions.

In some embodiments, the client device 102 does not determine the quality score. Rather, in these embodiments, the client device 102 will transmit the collected wireless network parameters to the server 106, which proceeds to store the collected wireless network parameters in database 110. Similarly, the server 106 will organize the collected wireless network parameters into a table and also calculate the quality score, which is then sent back to the client device 102 to be utilized in selecting from available wireless networks 104a, 104b and 104c.

In certain embodiments, the client device 102 will also keep a record of each location it visits and an amount of time it spends in that location in order to determine whether that location is one of the relevant locations. In some embodiments, the location of the client device 102 is determined by communication with GPS 108. While in other embodiments, the location is determined by the client device 102 triangulating its location from the available wireless networks 104a, 104b and 104c.

Once the client device 102 determines its location, the client device 102 proceeds to determine whether the location has been visited before by referencing a stored location table and if so records an additional visit so as to accumulate a number of visits by the client device 102 to that location. If the client device 102 has not visited the location before, then the client device 102 creates a new entry in the stored location table and enters the first visit. Also, in certain embodiments, the client device 102 will record the date of the visit in order to determine a frequency of visits to the location. Additionally, in certain embodiments, the client device 102 will determine how long the client device spends at the location.

In this regard, the client device 102 will build a table of locations it visits and associated with each location is a number of times visited and duration of time spent at the location. In certain embodiments, the duration of time spent at the location may be an average amount of time spent on each visit, or in other embodiments, may be a total amount of time spent in the location.

Based on the number of visits and the time spent at the location (either average or total), the client device 102 will determine whether the location is a relevant location. For instance, in certain embodiments, the client device 102 will compare the number of visits and the time spent at the location to respective threshold values, and if the number of visits and the time spent at the location exceed the threshold values, then the location is deemed to be a relevant location. In this regard, typically, the client device 102 will have at least one relevant location and likely more than one relevant location.

Furthermore, as mentioned previously, the relevant locations are places that the user of the client device 102 spends a majority of time, such as at home or work. However, as network conditions will change at different locations in the home or place of work, each such location may include multiple relevant locations. For instance, in a situation where a user works in an office building with multiple floors, the available wireless networks, such as wireless networks 104a, 104b and 104c may change from floor to floor. In this situation, each floor of the office building that the user spends a significant portion of time on may be included as a relevant location. Accordingly, in certain embodiments, the relevant location will be defined as a coordinate such as latitude and longitude and a radius around that coordinate. The radius will be determined based on changing wireless network conditions. In other words, the radius will be defined by an area in which the available wireless networks (such as wireless networks 104a, 104b and 104c) do not change. In this regard, each relevant location will have an associated area in which the available networks are consistently the same. Further, in certain embodiments, the coordinate may also include an elevation.

Figure 2:
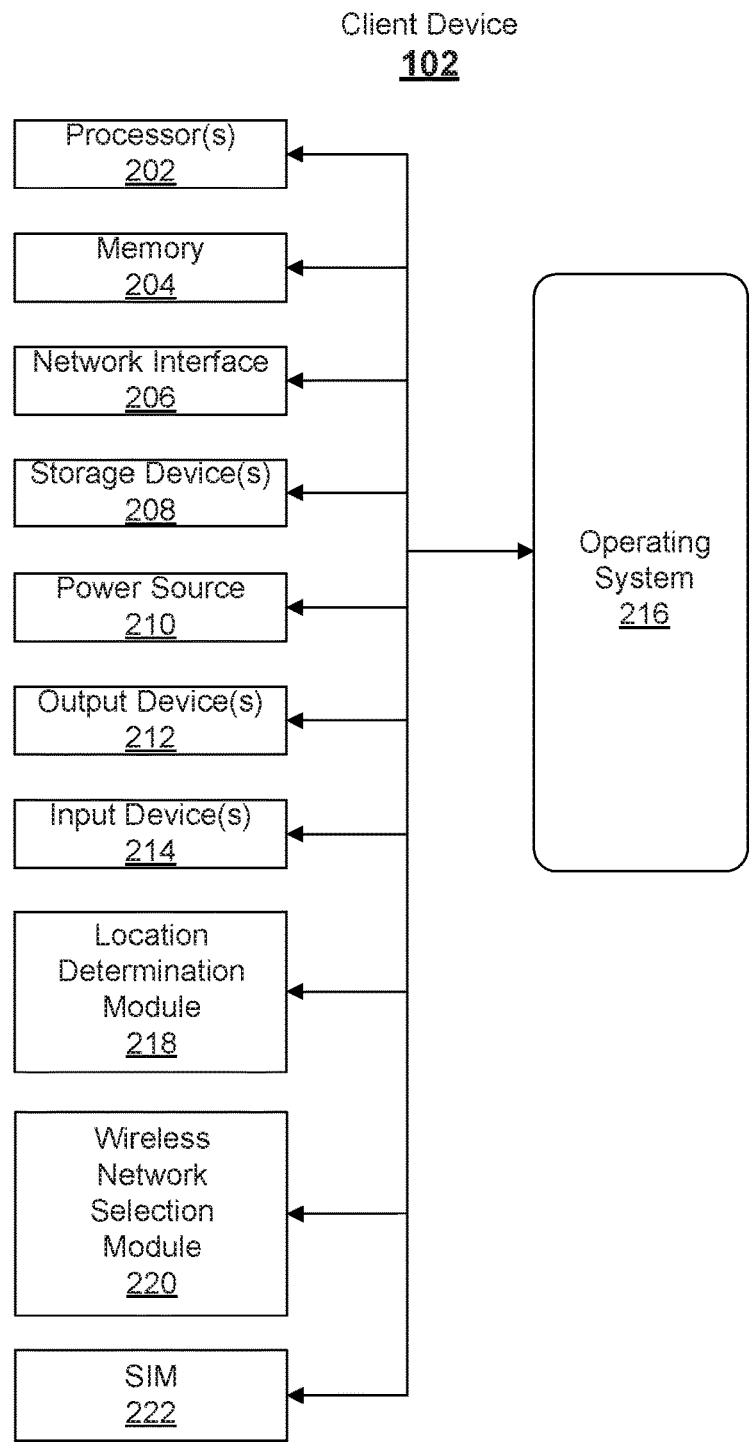
FIG. 2 is a block diagram illustrating components of a client device from FIG. 1, according to one embodiment.

Turning now to FIG. 2, a block diagram of basic functional components for the client device 102 of FIG. 1, according to one aspect of the disclosure, is illustrated. In general, many other embodiments of the client device 102 may be used. In the illustrated embodiment of FIG. 2, the client device 102 includes one or more processors 202, memory 204, network interface(s) 206, one or more storage devices 208, a power source 210, one or more output devices 212, one or more input devices 214, a location determination module 218, a wireless network selection module 220 and a Subscriber Identity Module (SIM) 222. The client device 102 also includes an operating system 216. Each of the components including the processor 202, memory 204, network interface(s) 206, storage device 208, power source 210, output device 212, input device 214, the location determination module 218, the wireless network selection module 220, the SIM 222 and the operating system 216 is interconnected physically, communicatively, and/or operatively for inter-component communications.

As illustrated, processor 202 is configured to implement functionality and/or process instructions for execution within client device 102. For example, processor 202 executes instructions stored in memory 204 or instructions stored on a storage device 208. Memory 204, which may be a non-transient, computer-readable storage medium, is configured to store information within client device 102 during operation. In some embodiments, memory 204 includes a temporary memory, an area for information not to be maintained when the client device 102 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some examples, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 102 uses network interface 206 to communicate with external devices via one or more networks, such as the plurality of wireless networks 104 and GPS network 108 of FIG. 1. Network interface 206 may be a network interface card, such as an Ethernet card, an optical transceiver, a radio frequency transceiver, or any other type of device that can send and receive information. Other non-limiting examples of network interfaces include Bluetooth®, 3G and WiFi radios in client computing devices, and USB.

The client device 102 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone or any other type of input device. In some examples, a presence-sensitive screen includes a touch-sensitive screen.

One or more output devices 212 are also included in client device 102. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 102 includes one or more power sources 210 to provide power to the device. Non-limiting examples of power source 210 include single-use power sources, rechargeable power sources, and/or power sources developed from nickel-cadmium, lithium-ion, or other suitable material.

The client device 102 includes an operating system 216. The operating system 216 controls operations of the components of the client device 102. For example, the operating system 216 facilitates the interaction of the processor(s) 202, memory 204, network interface 206, storage device(s) 208, input device 214, output device 212, power source 210, location determination module 218, wireless network selection module 220 and SIM 222.

The client device 102 further includes the location determination module 218, as illustrated in FIG. 2. The location determination module 218 determines the relevant locations for the client device 102. In this regard, the location determination module 218 of the client device 102 will determine the current location of the client device 102 and capture a number of times the client device 102 has visited that location (and in certain embodiments the frequency of those visits) and an amount of time spent at the location (either an average of each time visited or a cumulative amount of time). Further, the location determination module 218 of the client device 102 will compare the number of visits and the amount of time spent in the location to previously determined threshold values for a number of visits and amount of time spent at the location in order to determine whether the location is a relevant location for the client device 102.

Further, in embodiments where the frequency of visits is determined, the client device 102 will also compare the frequency of visits to a previously determined frequency threshold. In this regard, in some embodiments, the client device 102 comparison to a frequency threshold may replace the number of visits threshold comparison.

As an aside, while the location determination module 218 is illustrated in FIG. 2 as being separate from the processor 202, in certain embodiments, the location determination module 218 may be represented as an operational state of the processor 202. In this regard, the functions of the location determination module 218 may be defined by instructions stored on the memory 204 or the storage device 208 and executed by the processor 202 in order to perform the above discussed functions of the location determination module 218.

The client device 102 further includes the wireless network selection module 220, as illustrated in FIG. 2. The wireless network selection module 220 is utilized to select an available wireless network at a relevant location of the client device 102. In this regard, the wireless network selection module 220 will monitor the location of the client device 102 and reference the location determination module 218 in order to determine if the current location of the client device 102 is one of the relevant locations for the client device 102. If the current location is a relevant location, then the wireless network selection module 220 surveys the available wireless networks, such as wireless networks 104a, 104b and 104c (see FIG. 1) and determines whether wireless network parameters have been collected from the available wireless networks. If wireless network parameters have not been collected from each of the available wireless networks, then the wireless network selection module 220 will collect the wireless network parameters and store those in a table configured to organize data related to each available wireless network in the relevant location. Once wireless network parameters have been collected from each available wireless network, the wireless network selection module 220 will determine a quality score for each available wireless network based on the collected wireless network parameters and store the determined quality score in the table configured to organize data related to each available wireless network at the relevant location. Once the quality score has been determined for each available wireless network at the relevant location, the wireless network selection module 220 proceeds to select the wireless network with the highest quality score for the client device 102 to connect with.

As an aside, while the wireless network selection module 220 is illustrated in FIG. 2 as being separate from the processor 202, in certain embodiments, the wireless network selection module 220 may be represented as an operational state of the processor 202. In this regard, the functions of the wireless network selection module 220 may be defined by instructions stored on the memory 204 or the storage device 208 and executed by the processor 202 in order to perform the above discussed functions of the wireless network selection module 220. Additionally, in certain embodiments, the wireless network selection module 220 may include the network interface(s) 206.

In certain embodiments, the client device 102 further includes the SIM 222. The SIM 222 stores user profiles for identifying and connecting with certain types of wireless networks. For instance, the SIM 222 may include credentials for connecting the client device 102 with multiple carrier cellular networks provided by a plurality of cellular carriers over a variety of RATs. In this regard, when the wireless network with the highest quality score is a cellular network that requires SIM data to connect with that network, the wireless network selection module 220 will utilize the stored network credentials on the SIM 222 in order to gain access to that network. As the SIM 222 stores multiple carrier cellular profiles, the wireless network selection module 220 will be able to cause the client device 102 to connect with a variety of wireless networks from a variety of cellular carriers by switching profiles as needed based on the determined quality score in each relevant location.

As an aside, in certain embodiments, the SIM 222 is a single SIM card. While in other embodiments, the SIM 222 may be multiple SIM cards either inserted into a client device 102 configured to accept and utilize multiple cards simultaneously, or inserted individually by a user of the client device 102 based on the selected wireless network. Additionally, in other embodiments, the SIM 222 may be an electronic SIM (eSIM) with the credentials for connecting the client device 102 with multiple carrier cellular networks provided by a plurality of cellular carriers stored electronically on either memory 204 or storage device 208 or on another secure memory associated with the client device 102.

Figure 3:
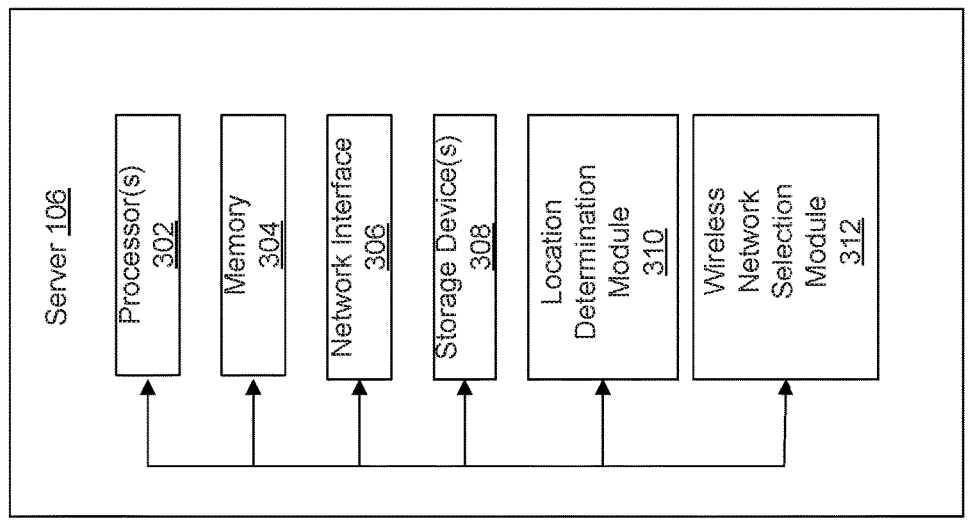
FIG. 3 is a block diagram illustrating components of a server from FIG. 1, according to one embodiment.

Moving to FIG. 3, a block diagram of basic functional components for the server 106 is depicted, according to one aspect of the disclosure. The server 106 includes one or more processors 302, a memory 304, a network interface 306, and one or more storage devices 308. Additionally, in some embodiments, the server 106 further includes the location determination module 310 and the wireless network selection module 312. In some embodiments, each of the components including the processor(s) 302, the memory 304, the network interface 306, the storage device 308, the location determination module 310 and the wireless network selection module 312 are interconnected physically, communicatively, and/or operatively for inter-component communications.

As illustrated, processors 302 are configured to implement functionality and/or process instructions for execution within server 106. For example, processors 302 execute instructions stored in memory 304 or instructions stored on storage devices 308. Memory 304, which may be a non-transient, computer-readable storage medium, is configured to store information within server 106 during operation. In some embodiments, memory 304 includes a temporary memory, i.e. an area for information not to be maintained when the server 106 is turned off. Examples of such temporary memory include volatile memories such as random access memories (RAM), dynamic random access memories (DRAM), and static random access memories (SRAM). Memory 304 also maintains program instructions for execution by the processors 302.

Storage devices 308 also include one or more non-transient computer-readable storage media. Storage devices 308 are generally configured to store larger amounts of information than memory 304. Storage devices 308 may further be configured for long-term storage of information. In some examples, storage devices 308 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 106 uses network interface 306 to communicate with external devices via one or more networks, such as the plurality of wireless networks 104 of FIG. 1. Such networks may include one or more wireless networks, wired networks, fiber optics networks, and other types of networks through which communication between the server 106 and an external device may be established. Network interface 306 may be a network interface card, such as an Ethernet card, an optical transceiver, a radio frequency transceiver, or any other type of device that can send and receive information.

In certain embodiments, the server 106 is configured to perform the functions of the location determination module 218 and the wireless network selection module 220, as discussed above in relation to FIG. 2. In these embodiments, the server includes the location determination module 310 and the wireless network selection module 312. In these embodiments, the client device 102 may or may not still include the location determination module 218 and the wireless network selection module 220. Additionally, in certain embodiments, the wireless network selection module 312 may include the network interface(s) 306.

Regardless of whether the client device 102 includes the location determination module 218 and the wireless network selection module 220, in these embodiments, the client device 102 will provide the current location of the client device 102 to the server 106 such that the information can be utilized by the location determination module 310 to determine whether client device 102 is in a relevant location and can also be used by the wireless network selection module 312 to both determine a highest quality available wireless network in the relevant location and instruct the client device 102 to attach to the highest quality wireless network. In this regard, the location determination module 310 and the wireless network selection module 312 operate in much the same way as the location determination module 218 and the wireless network selection module 220 with the exception of receiving the current location information from the client device 102 instead of determining the current location itself.

Figure 4:
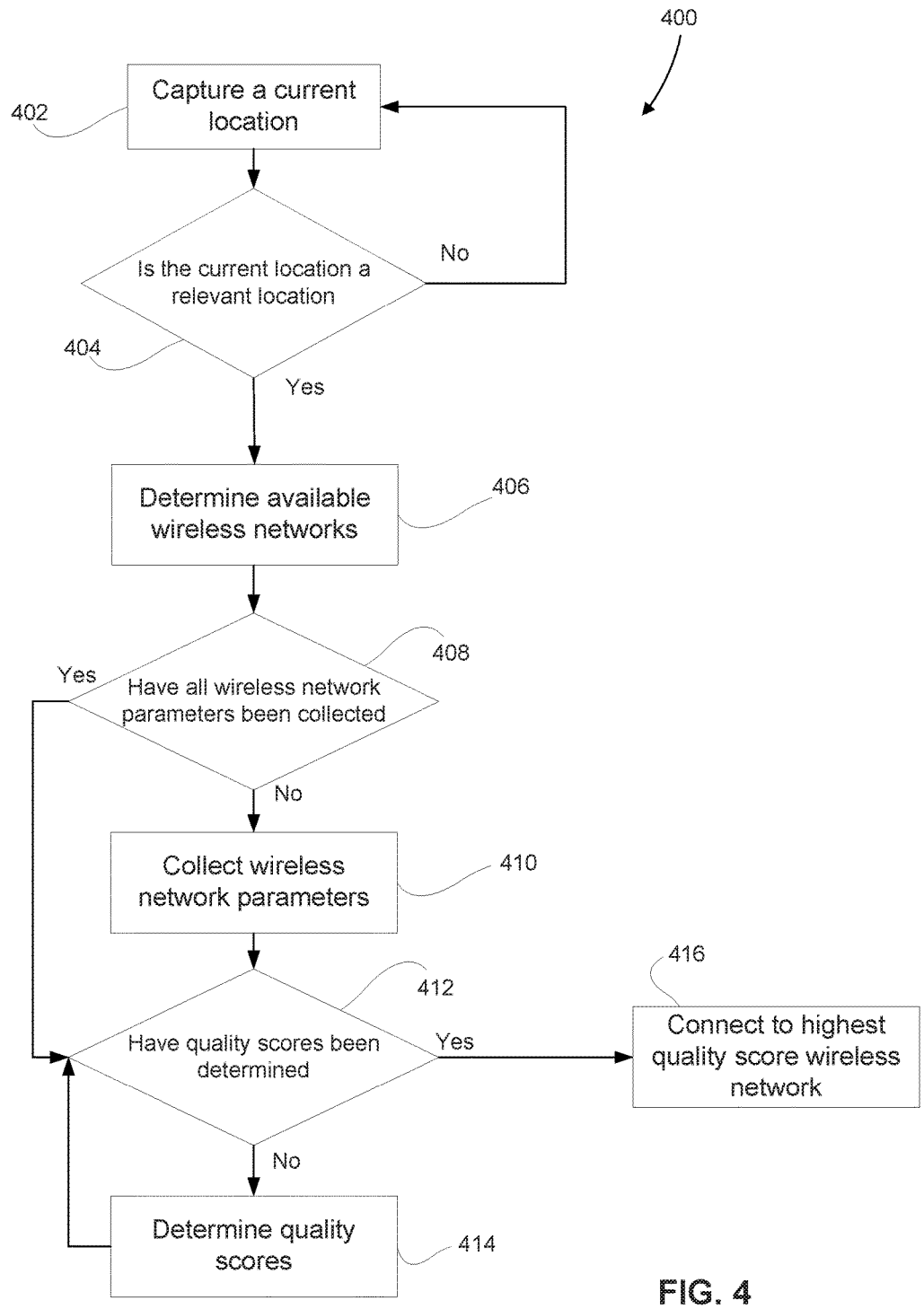
FIG. 4 is a flow diagram for connecting the client device of FIG. 2 to a highest quality wireless network, according to an example embodiment.

Moving to FIG. 4, a flow diagram 400 for connecting to a highest quality wireless network, according to an example embodiment, is illustrated. At step 402, the client device 102 (see FIG. 1) captures its current location. In certain embodiments, capturing the current location involves determining a location via GPS, receiving or obtaining a location from a location API, or any other technique for ascertaining a location of the client device 102. At step 404, the client device 102 compares the current location to a list or table of previously determined relevant locations for the client device 102. By doing this, the client device 102 is able to determine whether the current location is within an area defining one of the relevant locations. If at step 404, the client device 102 determines that it is not within an area defining a relevant location, then the client device 102 returns to step 402 and continues to record its current location for determining whether it enters one of its relevant locations. However, if the client device 102 determines that it is within an area defining one of its relevant locations, then the flow diagram 400 proceeds to step 406.

At step 406, the client device 102 determines available wireless networks (such as wireless networks 104a, 104b and 104c in FIG. 1) at the relevant location. And at step 408, the client device 102 will search a table created for the relevant location including each available wireless network and whether a quality score has been determined based on previously collected wireless network parameters for each wireless network in the table. If wireless network parameters have not been collected from each available wireless network, then the client device 102 will proceed to step 410 and connect to one of the wireless networks that has no wireless network parameters in the table in order to collect the needed wireless network parameters. However, if wireless network parameters have been collected from each of the available wireless networks, then the client device 102 will proceed to step 412.

As an aside, in some embodiments, at step 410, the client device 102 (see FIG. 1) will generally connect to the wireless network with no previously collected wireless network parameters for the duration of time the client device 102 is staying at the relevant location. In this regard, it may take one or more days to collect wireless network parameters from each of the available wireless networks, as it will likely require multiple visits. This is done so as to collect wireless network parameters over a long enough period of time to collect a broader sample of data from that wireless network.

Additionally, in the event the client device 102 must switch from the selected wireless network, the client device 102 will track a percentage of the time spent on the various wireless networks during that particular visit such that the reliability of the collected wireless network parameters can be determined based on the percentage of time spent on that particular wireless network. In this manner, the client device 102 will know that for future visits, even though wireless network parameters have previously been collected for the wireless network, additional measured parameters may need to be collected in situations where the tracked percentage of time is low such that a reliable amount of data is collected for determining the quality of that particular wireless network.

Further, in other embodiments, the client device 102 will attach to each available wireless network that has not previously had wireless network parameters collected during a single visit to that relevant location.

At step 412, the client device 102 (see FIG. 1) checks to determine whether a wireless network quality score has been determined based on the collected wireless network parameters for each available wireless network at the relevant location. In some embodiments, this is done by searching the table of available wireless networks stored on the memory 204 or storage device 208 (see FIG. 2) of the client device 102 for a previously determined quality score. If a quality score has not been determined for at least one of the available wireless networks, then the client device 102 determines the missing quality scores at step 414. Once all of the quality scores have been determined, the client device 102 proceeds to connect to the wireless network with the highest quality score at step 416.

The above steps in flow diagram 400 are performed for each relevant location for the client device 102 (see FIG. 1) such that a highest quality wireless network is determined for each relevant location. Additionally, in certain embodiments, after expiration of a threshold amount of time, the above steps of flow diagram 400 will be performed by the client device 102 again in order to determine a subsequent highest quality wireless network in each relevant location for the client device 102. In this regard, the client device 102 tracks the time since it determined a highest quality wireless network for each relevant location such that at the expiration of the threshold amount of time a subsequent highest quality wireless network for that relevant location may be determined.

Additionally, in embodiments where the available wireless networks are cellular networks provided by a variety of cellular carriers, the SIM 222 (see FIG. 2) of the client device 102 (see FIG. 1) should contain credentials for accessing each of the variety of carrier cellular networks. Accordingly, the client device 102 will be able to autonomously switch between carrier cellular networks by using profile switching from the SIM 222. In this regard, as the client device 102 moves from one relevant location to the next, various SIM profiles containing different access credentials for various carrier networks may be utilized to access the highest quality wireless network in each relevant location.

Figure 5:
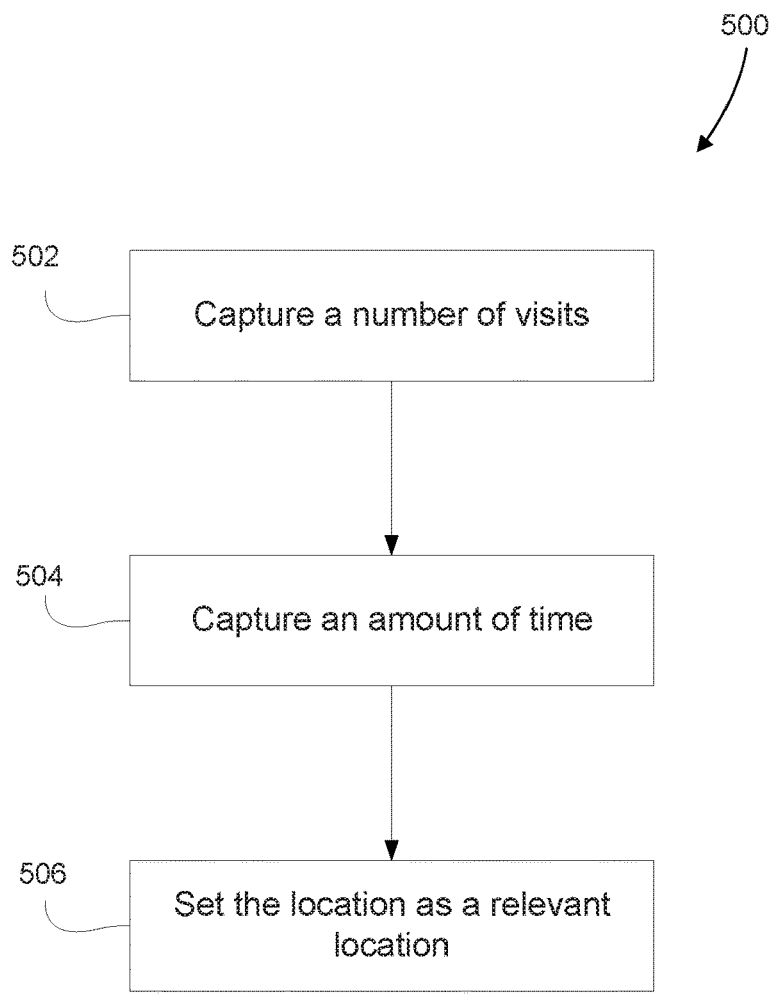
FIG. 5 is a flow diagram for determining what locations are relevant locations for the client device of FIG. 2, according to an example embodiment.

Moving to FIG. 5, a flow diagram 500 for determining what locations are relevant locations for the client device 102 (see FIG. 1), according to an example embodiment, is illustrated. At step 502, the client device 102 captures or records a number of visits to a particular location made by the client device 102. Additionally, at step 504, once the client device 102 records that it has visited a particular location, the client device 102 will determine an amount of time it spends in that location during that visit. At step 506, the client device 102 utilizes the collected number of visits to a particular location and the length of time spent in that location to determine whether the specific location should be set as an important or, in other words, relevant location for the client device 102.

The determination of whether a particular location is a relevant location, in one embodiment, is based on the number of times the client device 102 (see FIG. 1) visited the location and the amount of time spent in that location exceeding a previously set threshold value for number of visits and another threshold value for the amount of time spent in a location. In another embodiment, the determination may be based on the number of visits exceeding the threshold and the amount of time exceeding a specific percentage of a day. In another embodiment, the calendar date of the visit may be recorded as well in order to determine a frequency of visits such that if the frequency of visits persists for a long enough time period, then the location will be determined to be a relevant location.

Additionally, in certain embodiments, when the client device 102 (see FIG. 1) determines that a location is a relevant location, the client device 102 monitors the available wireless networks while moving about at the location. In these embodiments, the client device 102 monitors the available wireless networks in order to determine an area around the location where the available wireless networks are constant. This area is then set as the area defining the relevant location. Accordingly, in these embodiments, the relevant location can be defined by latitude and longitude points and a radius around that point in which the available wireless networks do not change. Also, in some embodiments, in addition to the latitude and longitude, an elevation point may be utilized to define the relevant location.

Figure 6:
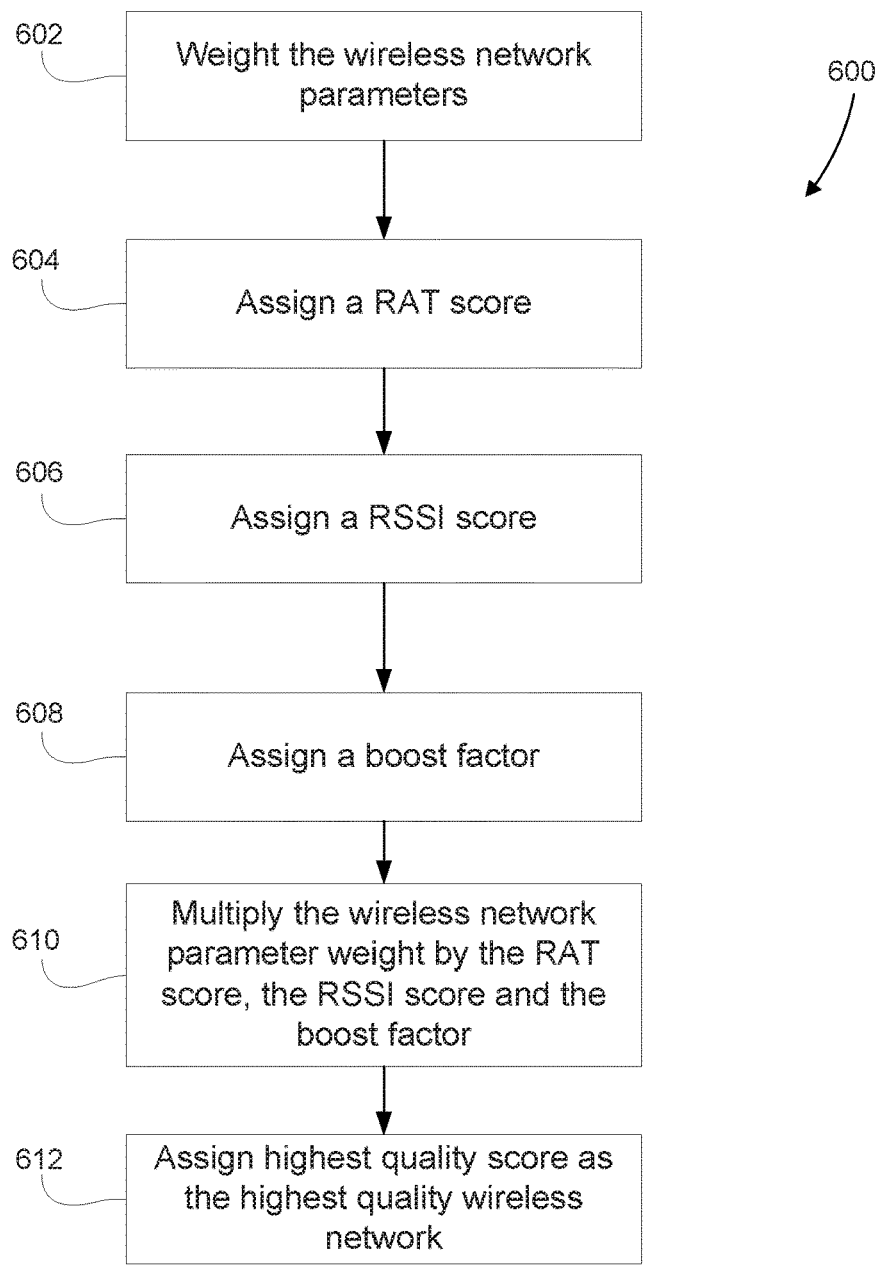
FIG. 6 is a flow diagram for determining a highest quality wireless network, according to an example embodiment.

Moving to FIG. 6, a flow diagram 600 for determining a highest quality wireless network, according to an example embodiment, is illustrated. At step 602, the client device 102 (see FIG. 1) determines a weighting factor for wireless networks based on the recency of when the wireless network parameters were collected. In this regard, wireless networks with more recently collected wireless network parameters have a higher weighting factor than older, previously collected wireless network parameters.

At step 604, the client device 102 (see FIG. 1) assigns a RAT score based on the RAT collected as part of the wireless network parameters. The score is unique to the actual RAT and based on a variety of factors, such as theoretical speed of both uplink and downlink for the RAT. At step 606, the client device 102 assigns a score based on the average RSSI for the wireless network. The RSSI score is higher for a higher average RSSI and lower for a lower average RSSI.

Additionally, in some embodiments, at step 608, a boost factor may be applied for certain carriers such that a particular carrier will be provided an advantage in the determination of the highest quality wireless network. Typically, in this embodiment, the boost factor is included in recognition that some carriers have better coverage is certain geographic areas.

Further, at step 610, the client device 102 (see FIG. 1) determines an overall score for each available wireless network by multiplying the weighting factor, the RAT score, the RSSI score and in certain embodiments, the boost factor for each available wireless network. And at step 612, the client device 102 will assign the available wireless network with the highest quality score as the default wireless network for that particular relevant location.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

Moreover, in some embodiments, the user of the client device 102 may require that the relevant locations for the client device 102 be stored exclusively on the client device 102 such that the information pertaining to the relevant locations is not shared. Additionally, in certain embodiments, the information pertaining to the relevant locations of the client device 102 is encrypted such that unauthorized systems or individuals cannot access that information.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A server configured to choose a wireless network for a client device, the server comprising:
 a location determination module configured to receive a location of the client device and to determine whether the location is within an area defining a relevant location for the client device, wherein determining whether the location is within the area defining the relevant location is based on a number of visits the client device made to the location and an amount of time the client device spent in the location; and
 a wireless network selection module configured to:
  receive wireless network parameters collected by the client device from each of a plurality of wireless networks available at the location of the client device when the location is within the area defining the relevant location;
  determine a highest quality wireless network based on the received wireless network parameters; and
  transmit an indication of the highest quality wireless network to the client device.

2. The server of claim 1, further configured to receive the number of visits the client device made to the location and the amount of time the client device spent in the location, and to store the received number of visits the client device made to the location, the received amount of time the client device spent in the location, and the received wireless network parameters in a memory of the server.

3. The server of claim 2, wherein the received wireless network parameters comprise a mobile network code (MNC), a mobile country code (MCC), a Radio Access Technology (RAT), or a received signal strength indicator (RSSI).

4. The server of claim 3, wherein the wireless network selection module is further configured to:
 determine a weighting factor for each of the plurality of wireless networks based on the received wireless network parameters for each of the plurality of wireless networks collected by the client device;
 determine a RAT score for each of the plurality of wireless networks based on the received wireless network parameters for each of the plurality of wireless networks collected by the client device; and
 determine a RSSI score for each of the plurality of wireless networks based on the received wireless network parameters for each of the plurality of wireless networks collected by the client device.

5. The server of claim 4, wherein the highest quality wireless network is determined based on an overall score for each of the plurality of wireless networks, wherein the overall score for each of the plurality of wireless networks is determined by multiplying the weighting factor, the RAT score, and the RSSI score for each of the plurality of wireless networks.

6. The server of claim 2, wherein the received wireless network parameters comprise a service set identification (SSID), a basic service set identification (BSSID), network packet latency, or network packet throughput.

7. The server of claim 1, wherein the wireless network selection module is further configured to instruct the client device to connect to the highest quality wireless networking.

8. The server of claim 1, wherein the area defining the relevant location includes a plurality of areas and the wireless network selection module is further configured to:
 receive the wireless network parameters collected by the client device from each of the plurality of wireless networks available in each of the plurality of areas;
 determine a best quality wireless network in each of the plurality of areas; and
 transmit an indication of the best quality wireless network in each of the plurality of areas to the client device and instruct the client device to connect to the best quality wireless network in each of the plurality of areas as the client device moves around the plurality of areas.

9. The server of claim 1, wherein determining whether the location is within the area defining the relevant location is based on the number of visits the client device made to the location exceeding a first threshold value, and the amount of time the client device spent in the location exceeding a second threshold value.

10. A method in a server for choosing a wireless network for a client device, the method comprising:
receiving a current location of the client device;
determining whether the current location of the client device is within an area defining a relevant location of one or more relevant locations for the client device, wherein determining whether the current location of the client device is within the area defining the relevant location is based on a number of visits the client device made to the current location and an amount of time the client device spent in the current location;
receiving wireless network parameters collected by the client device from available wireless networks at the current location of the client device when the current location is within the area defining the relevant location;
determining a highest quality wireless network out of the available wireless networks; and
transmitting an indication of the highest quality wireless network to the client device.

11. The method of claim 10, wherein determining the one or more relevant locations comprises:
receiving a number of times the client device visited a location;
receiving an amount of time the client device spent at the location for each visit made to the location; and
conditionally setting the location as one of the one or more relevant locations based on the number of times the client device visited an area defining the location and the amount of time the client device spent with the area defining the location.

12. The method of claim 11, wherein the received wireless network parameters comprise a mobile network code (MNC), a mobile country code (MCC), a Radio Access Technology (RAT), or a received signal strength indicator (RSSI).

13. The method of claim 12, further comprising:
determining a weighting factor for each of the available wireless networks based on the received wireless network parameters for each of the available wireless networks collected by the client device;
determining a RAT score for each of the available wireless networks based on the received wireless network parameters for each of available wireless networks collected by the client device; and
determining a RSSI score for each of the available wireless networks based on the received wireless network parameters for each of the available wireless networks collected by the client device.

14. The method of claim 11, wherein the received wireless network parameters comprise a service set identification (SSID), a basic service set identification (BSSID), network packet latency, or network packet throughput.

15. The method of claim 10, further comprising storing the highest quality network as being a wireless network of choice for the client device when the client device is within the area defining the relevant location.

16. The method of claim 15, wherein, after an expiration of a threshold amount of time, the method further comprises:
receiving additional wireless network parameters collected by the client device from the available wireless networks at the current location of the client device when the current location is within the area defining the relevant location;
determining a subsequent highest quality wireless network out of the available wireless networks based on the received additional wireless network parameters; and
transmitting an indication of the subsequent highest quality wireless network to the client device and instructing the client device to connect to the subsequent highest quality wireless network.

17. The method of claim 16, further comprising storing the subsequent highest quality network as being the wireless network of choice for the client device when the client device is within the area defining the relevant location.

18. The method of claim 10, wherein the area defining the relevant location includes a plurality of areas and the method further comprising:
receiving the wireless network parameters collected by the client device from the available wireless networks in each of the plurality of areas;
determining a best quality wireless network in each of the plurality of areas; and
transmitting an indication of the best quality wireless network in each of the plurality of areas to the client device and instruct the client device to connect to the best quality wireless network in each of the plurality of areas as the client device moves around the plurality of areas.

19. The method of claim 10, further comprising instructing the client device to connect to the highest quality wireless networking.

20. The method of claim 19, wherein the highest quality wireless network is determined based on an overall score for each of the available wireless networks, wherein the overall score for each of the available wireless networks is determined by multiplying the weighting factor, the RAT score, and the RSSI score for each of the available wireless networks.

21. The method of claim 10, wherein determining whether the current location of the client device is within the area defining the relevant location is based on the number of visits the client device made to the current location exceeding a first threshold value, and the amount of time the client device spent in the current location exceeding a second threshold value.

* * * * *